(12) United States Patent
Jeon et al.

(10) Patent No.: US 7,877,538 B2
(45) Date of Patent: Jan. 25, 2011

(54) TESTING DATA TRANSFER TIME OF DISK DRIVES IN CONSUMER ELECTRONICS DEVICES

(76) Inventors: Edwin Jeon, 6710 Wolford Ct., Duluth, GA (US) 30097; Kevin Edward Maguire, 930 Camden Hill Ct., Lawrenceville, GA (US) 30045; Mark Randall Murray, P.O. Box 421637, Atlanta, GA (US) 30342

( * ) Notice: Subject to any disclaimer, the term of this patent is extended or adjusted under 35 U.S.C. 154(b) by 0 days.

(21) Appl. No.: 12/178,718

(22) Filed: Jul. 24, 2008

(65) Prior Publication Data

US 2008/0278836 A1 Nov. 13, 2008

Related U.S. Application Data

(62) Division of application No. 11/414,952, filed on May 1, 2006.

(51) Int. Cl.
*G06F 12/00* (2006.01)
(52) U.S. Cl. ............... 711/100; 711/111; 702/182; 702/186; 726/24
(58) Field of Classification Search .............. 711/112, 711/100, 111; 702/182, 186; 726/24
See application file for complete search history.

(56) References Cited

U.S. PATENT DOCUMENTS

| | | | | |
|---|---|---|---|---|
| 5,491,808 A | * | 2/1996 | Geist, Jr. ............... | 711/100 |
| 5,572,572 A | * | 11/1996 | Kawan et al. ........... | 379/90.01 |
| 5,721,952 A | | 2/1998 | Lin et al. ............... | 710/19 |
| 5,953,689 A | | 9/1999 | Hale et al. ............... | 702/186 |
| 6,865,514 B1 | | 3/2005 | Goguen et al. ........... | 702/186 |
| 7,054,790 B1 | * | 5/2006 | Rich ................... | 702/186 |
| 7,089,355 B2 | * | 8/2006 | Auerbach et al. ......... | 711/112 |
| 2003/0004680 A1 | | 1/2003 | Dara-Abrams et al. | |
| 2003/0061444 A1 | | 3/2003 | Herbst et al. | |
| 2004/0010563 A1 | * | 1/2004 | Forte et al. ............ | 709/215 |

(Continued)

FOREIGN PATENT DOCUMENTS

WO    WO 00/63909    10/2000

(Continued)

OTHER PUBLICATIONS

U.S. Official Action mailed Jun. 25, 2008 in U.S. Appl. No. 11/414,952.

(Continued)

*Primary Examiner*—Yong Choe
(74) *Attorney, Agent, or Firm*—Merchant & Gould

(57) ABSTRACT

Systems, apparatus and methods are disclosed for testing performance of a disk drive in a digital home communications terminal. One such method comprises: downloading a disk drive performance test application from a server over a communication channel; executing the test application to measure at least one time for data transfer of a group of sectors on the disk drive; and reporting the time to the server over the communication channel. A digital video recorder comprises: a disk drive; a communication interface; memory storing executable instructions thereon; and a processor configured by the executable instructions. The processor is configured to download a disk drive performance test application from a server over the communication interface; execute the test application to measure at least one time for data transfer of a group of sectors on the disk drive; and report the time to the server over the communication interface.

11 Claims, 10 Drawing Sheets

U.S. PATENT DOCUMENTS

| | | | |
|---|---|---|---|
| 2004/0093370 A1 | 5/2004 | Blair et al. | 709/200 |
| 2004/0194147 A1* | 9/2004 | Craven et al. | 725/111 |
| 2005/0076175 A1* | 4/2005 | Auerbach et al. | 711/112 |
| 2006/0015674 A1* | 1/2006 | Murotake | 711/101 |
| 2006/0158211 A1 | 7/2006 | Chung et al. | 324/765 |
| 2006/0195904 A1* | 8/2006 | Williams | 726/24 |
| 2006/0212777 A1 | 9/2006 | Hirao | 714/763 |
| 2007/0255518 A1 | 11/2007 | Jeon et al. | |
| 2007/0256110 A1 | 11/2007 | Russ et al. | |

FOREIGN PATENT DOCUMENTS

| | | |
|---|---|---|
| WO | WO 02/076100 A2 | 9/2002 |
| WO | WO 2007/130834 | 11/2007 |
| WO | WO 2007/133907 | 11/2007 |

OTHER PUBLICATIONS

U.S. Official Action mailed Dec. 12, 2008 in U.S. Appl. No. 11/414,952.

U.S. Official Action mailed Apr. 14, 2009 in U.S. Appl. No. 11/414,952.

U.S. Official Action mailed Nov. 30, 2009 in U.S. Appl. No. 11/414,952.

European Office Action mailed Sep. 19, 2008 in Application No. 07761306.5.

European Office Action mailed Sep. 26, 2008 in Application No. 07811853.6.

European Office Action mailed Dec. 10, 2008 in Application No. 07761306.5.

European Office Action mailed Dec. 10, 2008 in Application No. 07811853.6.

European Office Action mailed Dec. 17, 2008 in Application No. 07761306.5.

European Office Action mailed Dec. 17, 2008 in Application No. 07811853.6.

European Office Action mailed Jul. 28, 2009 in Application No. 07761306.5.

European Office Action mailed Jul. 28, 2009 in Application No. 07811853.6.

PCT Search Report mailed Dec. 11, 2007 in PCT/US2007/067365.

PCT Search Report mailed Dec. 11, 2007 in PCT/US2007/067448.

U.S. Office Action dated Mar. 2, 2010 cited in U.S. Appl. No. 11/414,822.

European Office Action dated Jul. 26, 2010 cited in Application No. 07 761 306.5.

U.S. Final Office Action dated Aug. 2, 2010 cited in U.S. Appl. No. 11/414,822.

European Office Action dated Jul. 26, 2010 cited in Application No. 07 811 853.6.

U.S. Office Action dated Apr. 27, 2010 cited in U.S. Appl. No. 11/414,952.

* cited by examiner

TESTING DATA TRANSFER TIME OF DISK DRIVES IN CONSUMER ELECTRONICS DEVICES

CROSS REFERENCE TO RELATED APPLICATIONS

This application is a divisional of U.S. patent application Ser. No. 11/414,952, filed May 1, 2006, which is entirely incorporated herein by reference.

FIELD OF THE DISCLOSURE

The present disclosure relates to disk drives, and more specifically, to a system and method for disk drive performance testing.

BACKGROUND

A digital video recorder (DVR) allows a user to record video programming to a recordable medium, and to play back the recorded programs. The recordable medium in a DVR is typically a disk drive (also known as a "hard disk" or a "hard drive"). Before a video program is recorded, it is digitally encoded, which occurs at a fixed rate. On play back, video decoding also occurs at a fixed rate. To function properly, a DVR disk drive should be able to complete read or write requests at a sustained threshold rate which is related to the encoding/decoding rate. If the performance of the DVR disk drive is below this threshold, the quality of the recording will be adversely affected, and in some cases the DVR will not be usable for recording and/or playback.

Performance testing of DVR disk drives can be performed at the factory, before the disk is deployed. However, disk drive performance depends on the physical conditions under which it is used (e.g., temperature) and can degrade over time. Therefore, a disk which passed the performance test at the factory may later fail at the consumer location. Also, factory testing is not helpful for units that have already been deployed. Thus, a need arises to address the above-mentioned problems, among others.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
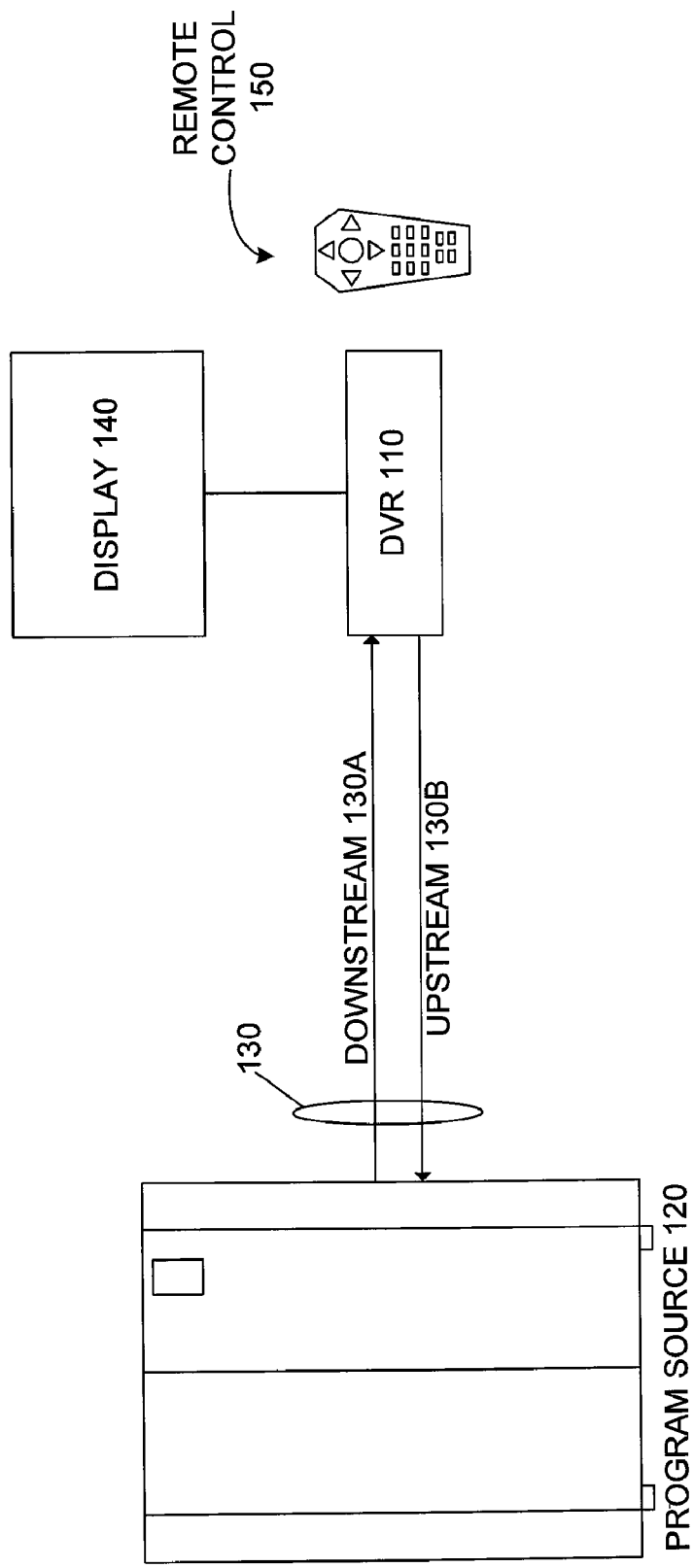
FIG. 1 is a block diagram of the environment in which some embodiments of a system and method for disk drive performance testing are located.

FIG. 1 is a block diagram of the environment in which some embodiments of the system and method for disk drive performance testing are located. A digital video recorder (DVR) 110 can, in some examples, record video programming that is received from a program source 120 over a communication channel 130. In addition, other embodiments include recorders that record audio and/or other data in addition to, or instead of, video. In one embodiment, program source 120 is a cable television network, but other wired and non-wired delivery mechanisms are also contemplated, for example, satellite, and over-the-air broadcasts received by an antenna, among others. DVR 110 can also play back a recorded video program for viewing on a display 40. A user can program DVR 110 through an input device such as a remote control 150 or a keyboard (not shown).

In some embodiments, communication channel 130 is uni-directional, and DVR 110 receives but does not transmit. In other embodiments, communication channel 130 is bi-directional, allowing DVR 110 to receive and transmit. A bi-directional channel 130 comprises a downstream channel 130D, used for communication from program source 120 to DVR 110, and an upstream channel 130U, used for communication from DVR 110 to program source 120.

In one embodiment, bi-directional communication channel 130 comprises a bi-directional HFC cable. In other embodiments, the bi-directional communication channel 130 is a logical composition of physical channels that are not themselves bi-directional. In one example of such a logical composition, among others, upstream channel 130U is a unidirectional hybrid fiber-coax (HFC) cable and upstream channel 130U is a (bi-directional) telephone line.

In one embodiment, DVR 110 is a standalone unit. In another embodiment, DVR 110 is integrated into a digital home communication terminal (DHCT), also known as a "set top" or "set top box." In yet another embodiment, DVR 110 is integrated into another consumer device, such as a television, a personal computer, or a portable device, among others.

Figure 2:
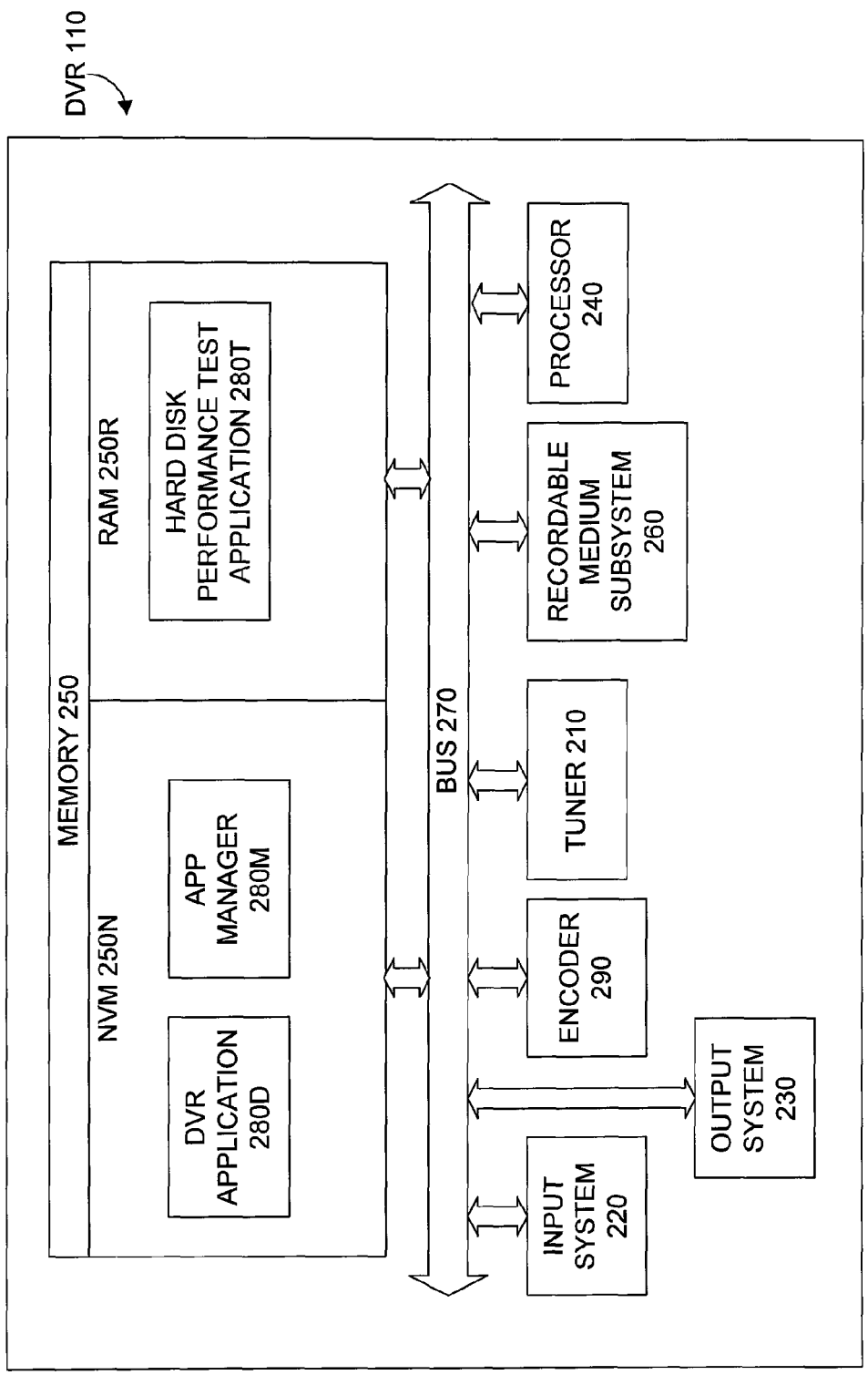
FIG. 2 is a block diagram showing selected components of the DVR from FIG. 1.

FIG. 2 is a block diagram showing selected components of the DVR 110 from FIG. 1. In accordance with one embodiment, among others, DVR 110 comprises: a tuner 210; an input system 220; an output system 230; a processor 240; memory 250; and a recordable medium subsystem 260. These components are coupled by a bus 270. Tuner 210 receives video programming from program source 120 (FIG. 1). Input system 220 receives user inputs from remote control 150 (FIG. 1), from buttons or keys located on the exterior of the DVR 110, or from a keyboard or other input device. Output system 230 drives a display device (e.g., display 40). Memory 250 contains instructions that are executed by processor 240 to control operations of DVR 110.

Memory 250 comprises non-volatile memory 250N and random access memory (RAM) 250R. Residing in memory 250 are application manager 280M, DVR application 280D and disk drive performance test application 280T. In one embodiment, DVR application 280D and application manager 280M reside in flash memory 250N and disk drive performance test application 280T resides in RAM 250R, while other embodiments include other memory arrangements and other locations for such elements.

Video programs are digitally encoded before being stored on recordable medium 260 by DVR application 280D. In the example DVR 110 of FIG. 2, digital encoding is performed by an encoder 290. In another embodiment, the program is digitally encoded by program source 120, rendering encoding by the DVR 110 unnecessary. Omitted from FIG. 2 are a number of conventional components, known to those skilled in the art, that are unnecessary to explain the operation of the system and method for disk drive performance testing.

Figure 3:
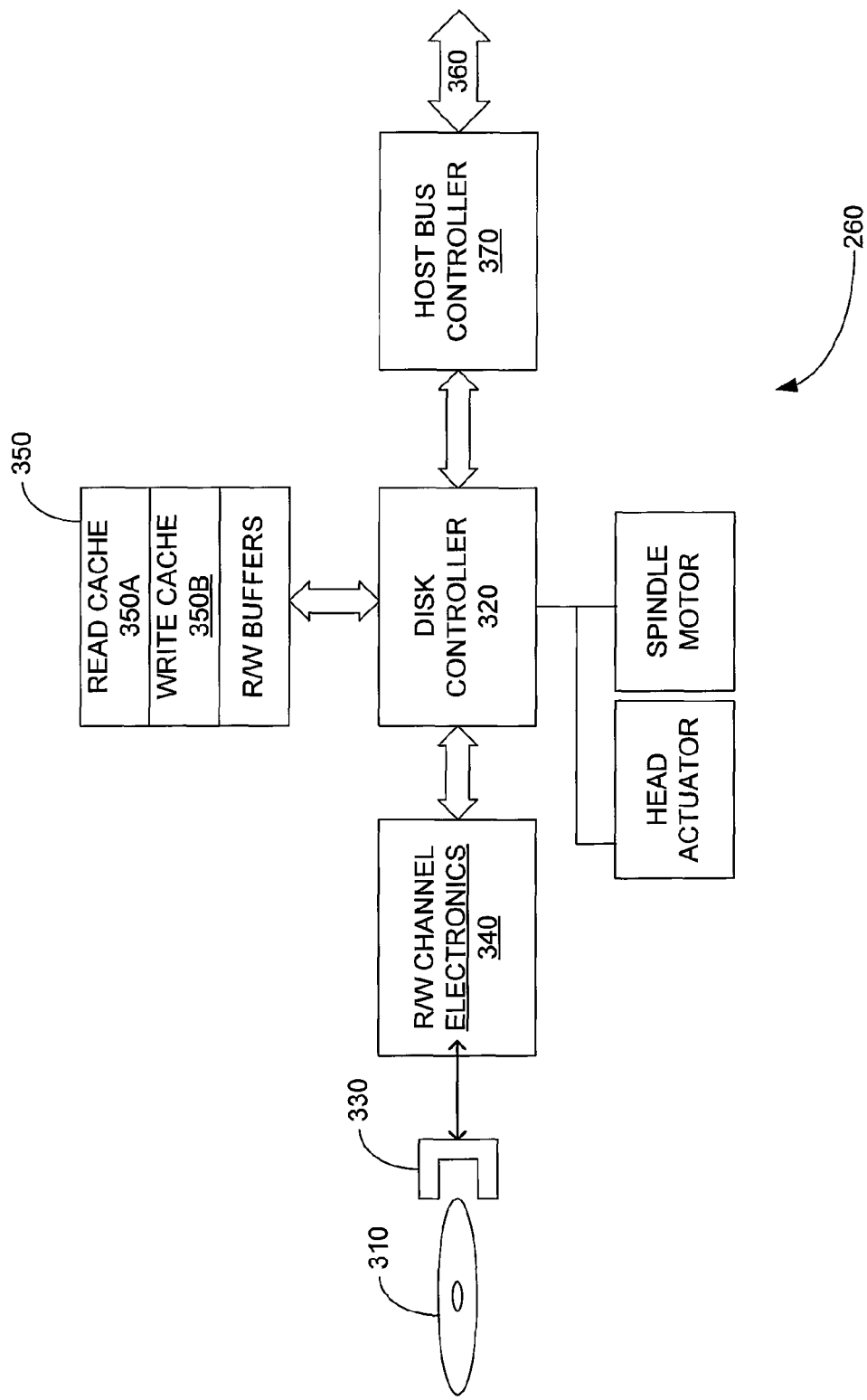
FIG. 3 is a hardware block diagram of one embodiment of recordable medium subsystem 260 from FIG. 2.

FIG. 3 is a hardware block diagram of one embodiment of recordable medium subsystem 260 from FIG. 2. In the embodiments described herein, the recordable medium is a disk drive. However, other types of magnetic and optical recordable media are also contemplated, such as digital versatile disc re-writable (DVD-RW), among others.

In the embodiment of FIG. 3, data is stored in magnetic form on a platter 310 which rotates on a spindle (not shown) at a constant rate. A disk controller 320 precisely positions a head 330 over the spinning platter 310, and read/write channel electronics 340 reads or writes data at this position by either detecting current in, or supplying current to, head 330. Once read, data bits are stored in buffers in memory 350, which is locally accessible to disk controller 320. Memory 350 also contains a read cache 350A and a write cache 350B.

Data is communicated between the hard disk subsystem 260 and the host processor 240 (FIG. 2) via a host bus 360. A host bus controller 370 is responsible for transferring data to be recorded into a portion of memory 350, and for transferring data read by the read/write channel 340 into a portion of memory 350.

Figure 4:
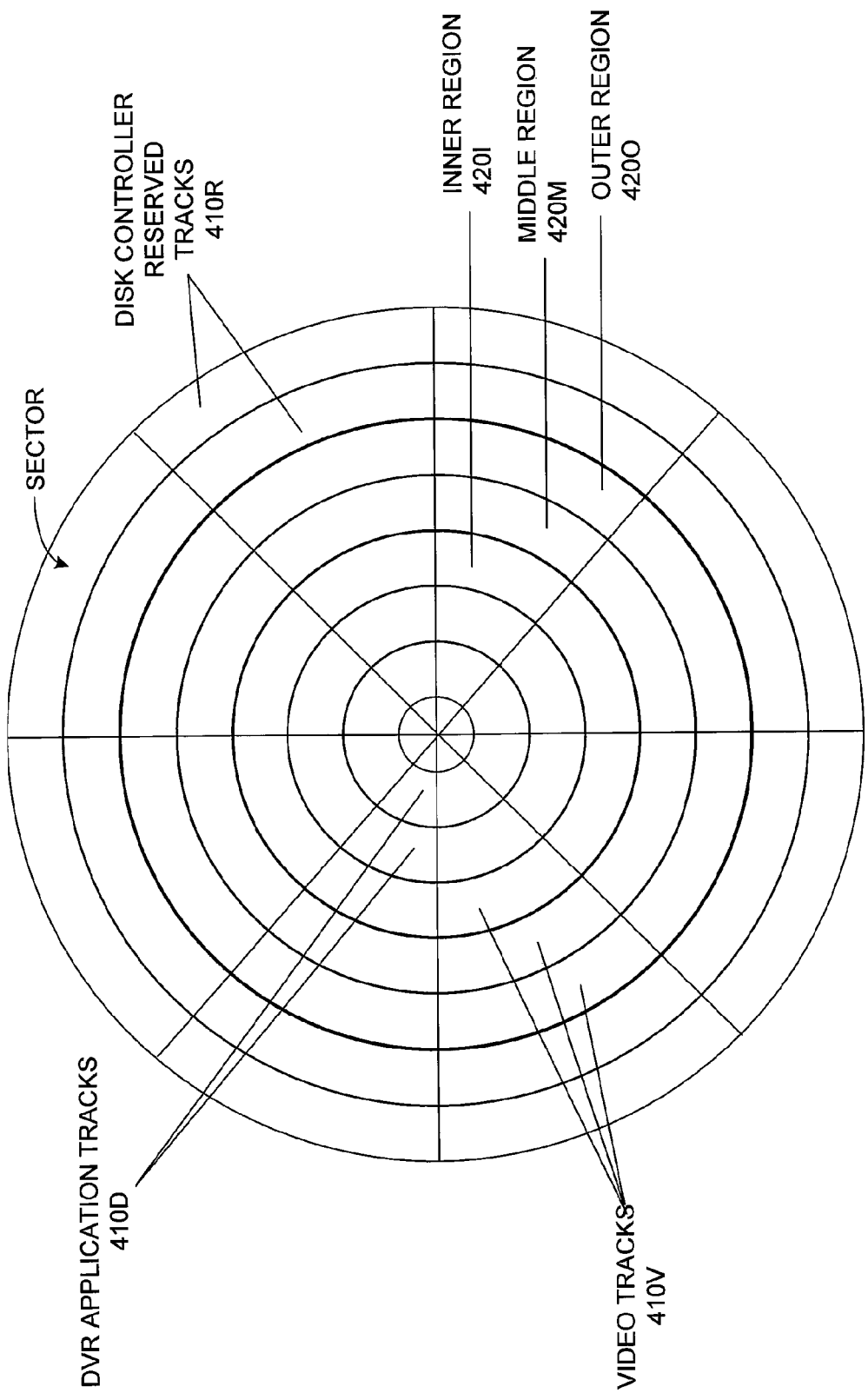
FIG. 4 is a diagram showing the layout of one embodiment of the platter of FIG. 3.

FIG. 4 is a diagram showing the layout of the platter 310 of FIG. 3. Platter 310 is composed of concentric circles, called tracks (410). The performance of a hard disk subsystem 260 is a function of the location of the data on the platter 310, since the data transfer rate decreases moving from outside to center. (This is true because platter 310 spins at a constant rate and track size decreases moving from outside to center.) Hence embodiments of the disk drive performance test application 280T are usable in all magnetic disk drive and optical drive applications, among others, and are not limited to use in a digital video recorder.

As is typical for a hard disk subsystem 260, in this embodiment of DVR 110 one or more outermost tracks 410R are reserved for use by disk controller 320. (Example uses of reserved tracks 410R by disk controller 320 include storing sector remap tables, error events observed by controller 320, results of diagnostic tests run by controller 320). In this embodiment of DVR 110, one or more innermost tracks 410D are reserved for used by DVR application 280D to store application-specific data. Examples of DVR application data stored on tracks 410D include a guide for programs received by DVR 110 and tables describing how stored programs are arranged on hard disk subsystem 260. The remaining tracks (410V), between the outer tracks 410R and the inner tracks 410D, are thus available for storing video programs.

The embodiments disclosed herein measure disk performance for sectors located in different regions 420 of platter 310, where each region 420 is located at a different distance from the center of platter 310. One embodiment of disk drive performance test application 280T measures disk performance for tracks 410V containing video data, while another embodiment also measures disk performance tracks 410D containing DVR application data. It will be understood by one of ordinary skill in the art that the choice of platter location for which performance measurements are made can be adapted to reflect knowledge of the layout of files and data on the disk, and that the layout can, in turn, be tuned to optimize the application for which the hard disk subsystem 260 is intended.

Each track 410 is composed of sectors 410. Sectors 410 are typically numbered starting from the outside and moving in. In the embodiment described herein, access time for sectors in three regions is measured: inner region 420I; middle region 420M; and outer region 420O. However, other embodiments with different numbers of regions are also contemplated.

In one embodiment, the size of each region 420 is 200 MB, or 409,600 sectors at 512 bytes per sector. The region size is a relatively small percentage of the total size of hard disk subsystem 260, since a typical DVR disk drive is 40 MB or larger. Measuring performance on relatively small regions of hard disk subsystem 260 appears to predict a failure of hard disk subsystem 260 with a useful degree of accuracy, and takes less time than measuring performance on larger regions. However, other embodiments include larger regions.

In one embodiment, the regions 420 are located as follows: outer region 420O starts after the DVR data portion 410D (FIG. 4), which is at sector 2,097,152 (1 GB/512 bytes per sector); middle region 420M starts at two-thirds of drive capacity plus 1 GB; and inner region 420I starts at drive capacity minus 2,508,806 bytes, so that the region excludes reserved tracks 410R. It is clear to those skilled in the art that these numbers can be adjusted to match various system parameters, for example, allocation or mapping of drive partitions or specific data elements.

In one embodiment, the sector locations of regions 420 are described by a data structure (not shown) maintained by disk drive performance test application 280T. In one embodiment, this section location table is configurable for a user of disk drive performance test application 280T, while in another embodiment, this table cannot be modified at run-time. Thus, a particular manufacturer of the device that contains test application 280T may choose to allow customization of the table by the user of the program, for example, when the end-user is a cable network operator.

Figure 5:
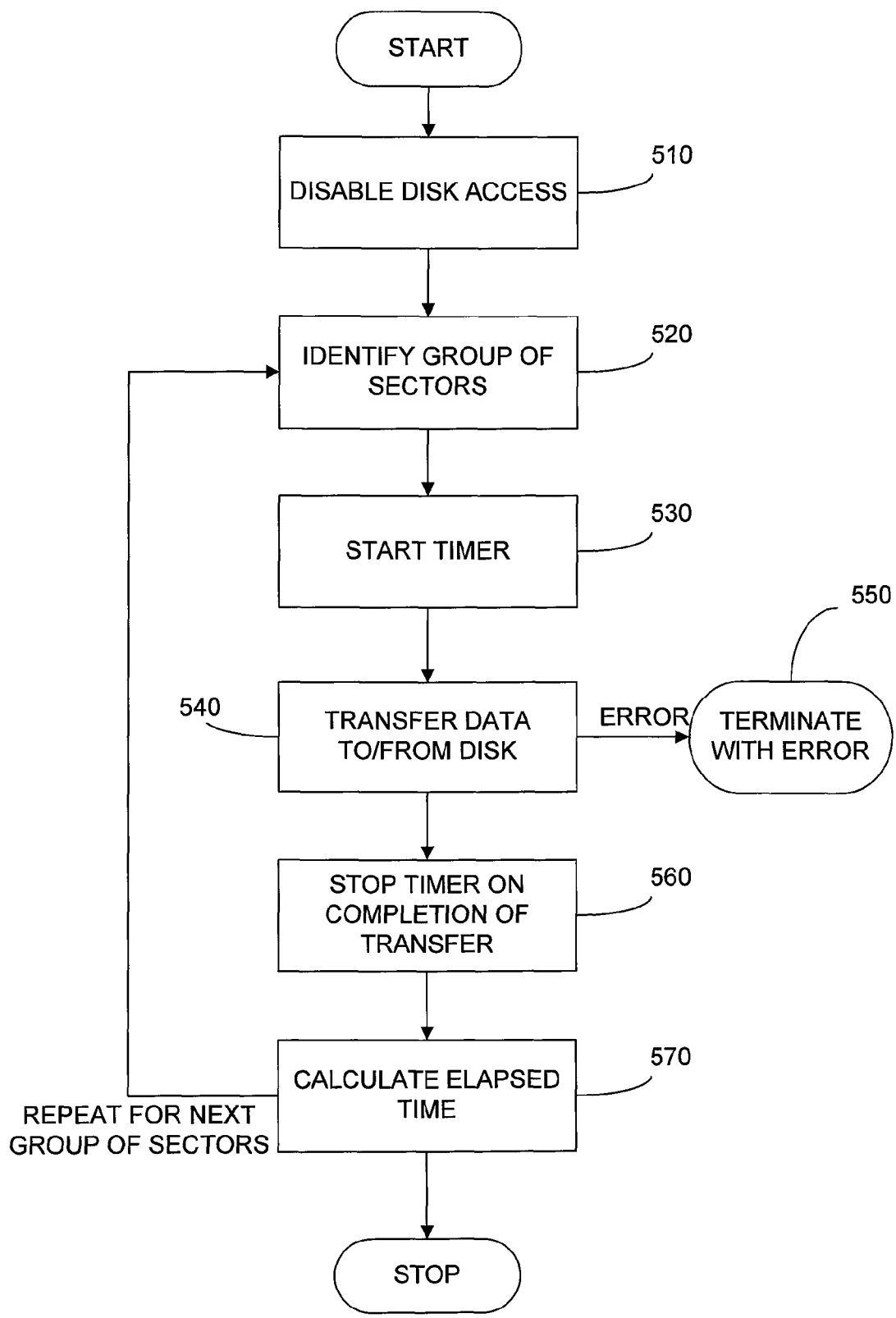
FIG. 5 is a flowchart of one embodiment of a disk drive performance test application.

FIG. 5 is a flowchart of one embodiment of disk drive performance test application 280T. At step 510, disk access by software other than the test software is disabled. Next (step 520), a group of sectors, located in a particular region of the platter, is identified for performance testing. At step 530, a timer is started. Next (step 540), data is transferred to (i.e., a disk write) or transferred from (i.e., a disk read) the selected group of sectors. At step 550, the performance test is stopped if the read or write sector operation reported an error.

At step 560, the timer is stopped when the data transfer completes. At step 570, the elapsed time for the data transfer is computed as the difference between the start time and the stop time. Steps 520-570 are repeated for each platter region to be tested. In one embodiment, the procedure of FIG. 5 is executed first to measure performance on a disk write and then for a disk read.

The mechanism used to disable access to the disk by software other than the disk drive performance test application 280T will depend on the software/hardware platform used by the DVR 110. In one embodiment, all software other than disk drive performance test application 280T uses a platform hard disk device driver which examines a particular memory location before accessing the disk. In this embodiment, disk drive performance test application 280T disables access by writing a flag value to this memory location. Other embodiments may use a different disable mechanism, for example, a specific API call.

One of ordinary skill in the art will be familiar with one or more application programming interfaces (APIs) available for a disk read or write of specified sectors. Such APIs may be provided by the operating system, the basic input/output system (BIOS) or the device driver for the disk drive. Accordingly, these APIs need not be discussed here. In one embodiment, the API provided by the Integrated Drive Electronics (IDE) device driver is used to perform sector reads and writes. The IDE device driver includes a read look-ahead feature that can be enabled or disabled, and in one embodiment, the read look-ahead is disabled while measuring performance of disk reads.

To reduce overhead, disk drive performance test application 280T reads/writes a relatively large number of sectors in each API call. One of ordinary skill in the art will understand that in one embodiment, the number of sectors per API call will depend on the amount of memory that can be allocated for read/write buffers by the disk drive performance test application 280T. Thus, if 5 MB can be allocated for data transfer buffers, a 200 MB region can be tested with 40 API calls, but if only 512 KB of buffers can be allocated, then the same 200 MB region would use 400 API calls.

The disk performance test results can thus be expected to vary as a function of the size of the data transfer buffers. In one embodiment, the measured elapsed time for data transfer is adjusted, or normalized, to account for this expected variation. The factor used for normalization can be empirically determined by running the performance tests on a DVR 110 using the same hard disk subsystem 260 and varying the total data transfer buffer size. In one embodiment, this normalization is determined during application development, before DVR 110 is deployed. In one embodiment, the normalization is performed by the disk drive performance test application 280T, but in other embodiments, normalization is done by another software entity which obtains the test results from the disk drive performance test application 280T.

Figure 6:
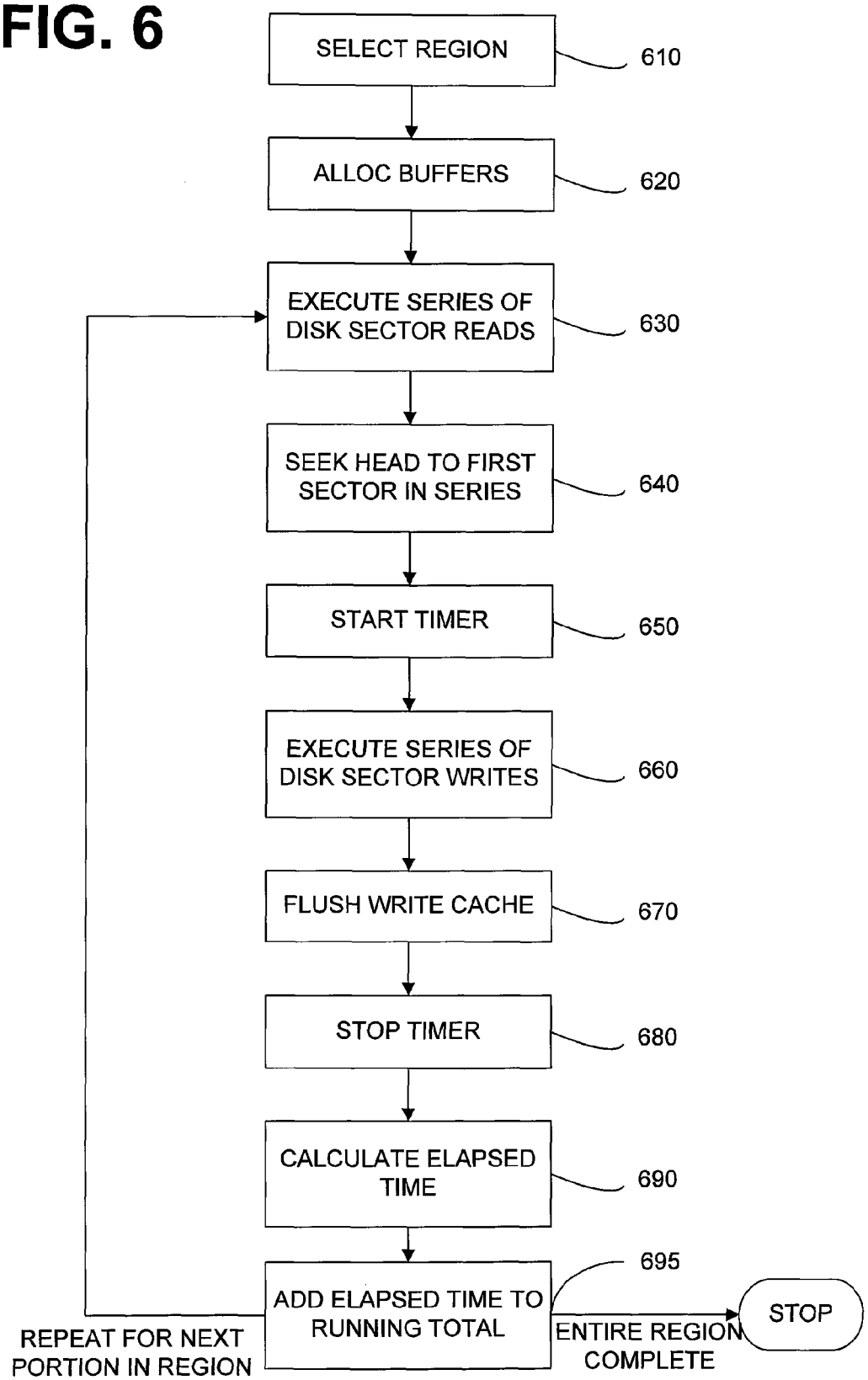
FIG. 6 is a flowchart of an embodiment of a disk drive performance test application, in which disk write performance of a particular region is measured.

FIG. 6 is a flowchart of an embodiment of disk drive performance test application 280T, in which disk write performance of a particular region is measured. The region size to be tested is typically much larger than available memory. Therefore, the test is performed by repeating a read-write cycle until the entire region has been covered.

In this embodiment, the test is performed in a non-destructive manner by reading and then writing the same data back. Because the data on the HDD is not altered, the data is always intact, even if the test is interrupted by a dramatic event such as a power-cycle. Thus, this embodiment is intrinsically non-destructive.

At step 610, a group of sectors, located in a particular region of the platter, is selected for non-destructive write performance testing. Next (step 620), read buffers are allocated. In order to reduce the influence of drive latency on the measurement, a relatively large amount of data is read/written during each read/write cycle. However, memory fragmentation reduces the probability of allocating a large data transfer buffer. One embodiment handles this trade-off by allocating 5 MB of read buffers in 512 KB chunks (for a total of 10 read buffers). Of course, amounts can vary greatly throughout the disclosure in other embodiments.

Step 630 executes a series of disk sector reads into the read buffers allocated in step 620. Each read in the series uses one of the allocated read buffers. As described earlier, each read operation in the series preferably reads multiple sectors, to reduce API call overhead.

At step 640, a head-seek is executed to move the disk head back to the first sector read in step 630. This seek minimizes the influence of intervening reads on the upcoming write operation. In one embodiment, the head-seek is accomplished by a sector read API call with the hard disk subsystem read cache 350A disabled.

At step 650, a timer is started. Step 660 executes a series of disk sector writes from the read buffers that were filled at step 630, thus writing back what was read earlier. Hard disk subsystem write cache 350B is enabled during the sector write operations. Next (step 670), the write cache is flushed, thus ensuring that the data has been committed to the disk, rather than cached in buffers which are internal to the disk controller.

The enable-write-flush strategy has two advantages. First, issuing writes with write cache 350B enabled allows hard disk subsystem 260 to issue writes in a fast and more efficient manner. Second, by issuing a cache-flush, the DVR 110 is able to accurately determine the moment at which the writing activity is finished. The result is a more accurate measurement of the faster available write strategy.

At step 680, the timer is stopped when the flush has completed. At step 690, the elapsed time for the read-write sequence is computed, as the difference between the start time and the stop time. At step 695, the elapsed time is added to a total elapsed time for the entire region.

The total amount of free memory in DVR 110 is typically much less than the region size (e.g., 8 MB of memory compared to a 200 MB region size). Therefore, each execution of steps 630-695 covers only a portion of the selected region under test, and steps 630-695 are repeated as necessary to cover the remaining portion of the region under test. For example, if the read-write operation (steps 630 and 660) used buffers totaling 5 MB, then steps 630-695 would be executed 40 times to cover a 200 MB region.

Occasionally, the data in a sector is not readable. This can happen, for example, because the write was faulty or because of physical damage to that location on the platter 310. The resulting error affects the performance measurement, since time is spent in attempting error recovery. Thus, a performance test that does not take this into account will be inaccurate. One embodiment, described in FIGS. 7A-B, accounts for this effect by invoking a sector-recovery process, which re-reads the bad sector and then resumes performance measurement.

Figure 7A:
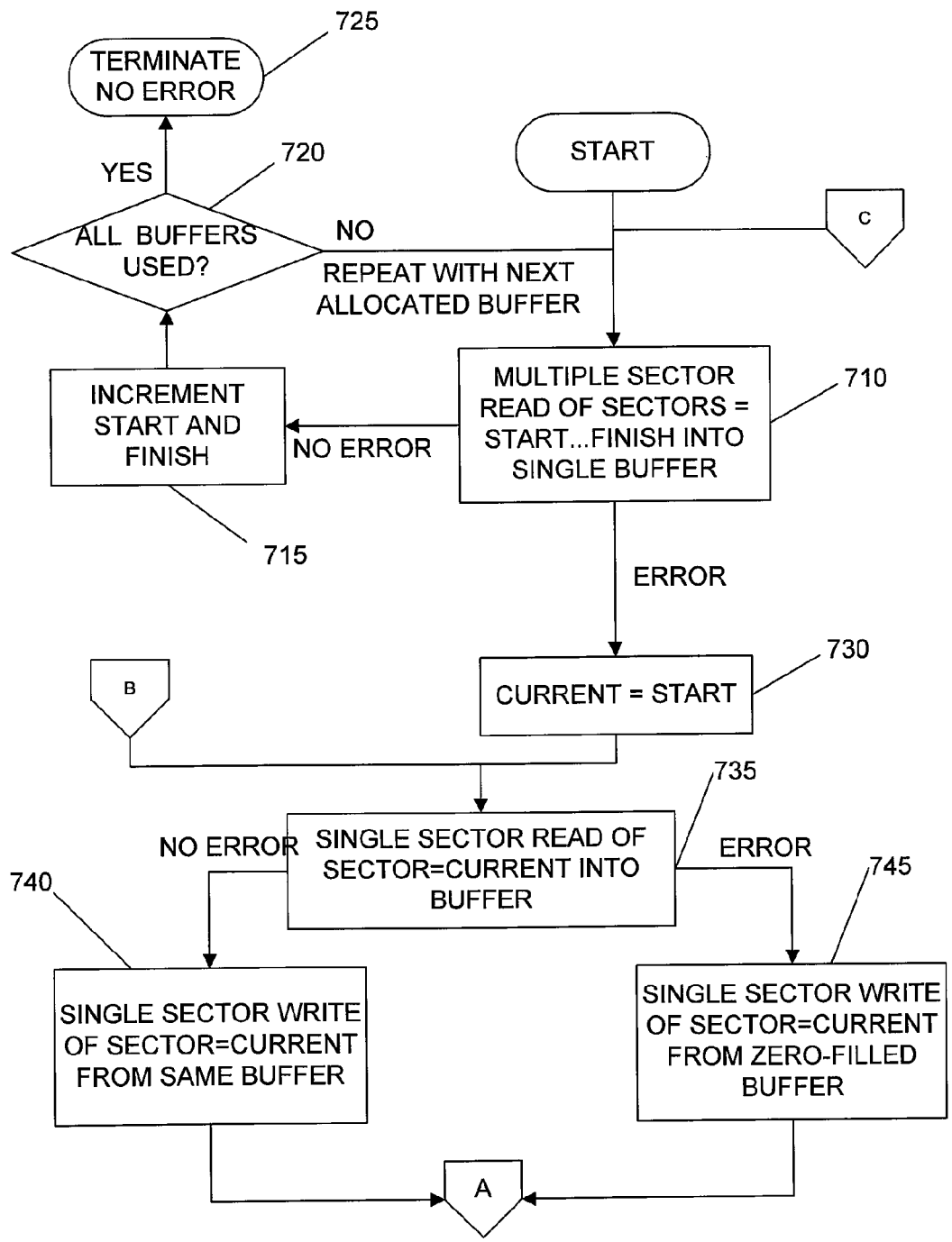
FIGS. 7A-B are a flowchart of one embodiment of the read operation step of FIG. 7.
Figure 7B:
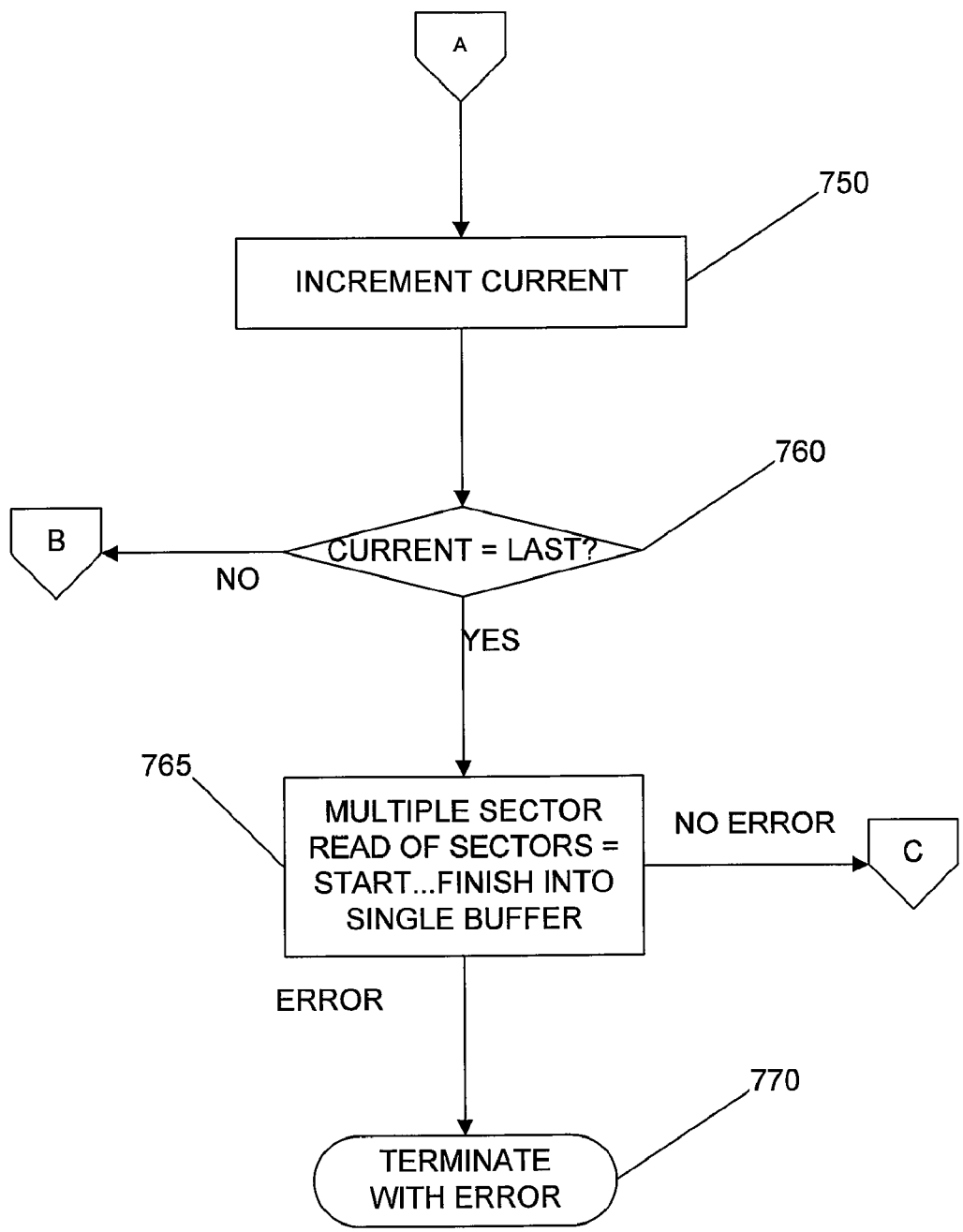

FIGS. 7A-B are a flowchart of the read operation step 630 (FIG. 6) which attempts to recover when a bad sector is encountered during a read. Step 710 executes a multiple sector read, spanning Sector=Start to Finish, into one of the already-allocated read buffers. If no error is reported from the read operation, then processing continues at step 715, where Start and Finish sector positions are incremented by the number of sectors in the read buffer. At step 720, disk drive performance test application 280T determines whether or not all the allocated buffers have been used. If Yes, then processing finishes at step 725 with no error reported. If No, then step 710 is executed again using the next read buffer.

If the sector read in step 710 reports an error, then disk drive performance test application 280T moves to reading and writing one sector at a time, starting with step 730. At step 730, a Current sector position is initialized to the Start sector position. Next (step 735), a single sector read is executed for Sector=Current into the last used read buffer. If no error is reported from the single sector read operation, then processing continues at step 740, where a single sector write is executed for the sector=Current, using the buffer which was filled by the last single sector read. Processing then continues at step 750 (FIG. 7B). If the single sector read reports an error, then processing continues at step 745, where a single sector write from a zero-filled buffer is executed for the sector=Current. Processing then continues at step 750 (FIG. 7B).

At step 750, the Current sector position is incremented by one (since a single sector read-then-write was performed). At step 760, disk drive performance test application 280T determines if all the sectors in the "block" have been read, where a "block" refers to the number of sectors read in each multiple sector read of step 710. If all sectors in the block have not yet been read individually, then single-sector read processing continues at step 735. Otherwise, processing continues at step 765 where the entire block (spanning Sector=Start to Finish) is read again with a multiple-sector read operation.

If the read operation in step 765 reports an error, then the performance test is terminated at step 770 and an error is reported. If the read operation completed with no error, then single sector read/write operations are finished. Disk drive performance test application 280T returns to multiple-sector operations using the next read buffer, at step 710 (FIG. 7A).

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

Figure 8:
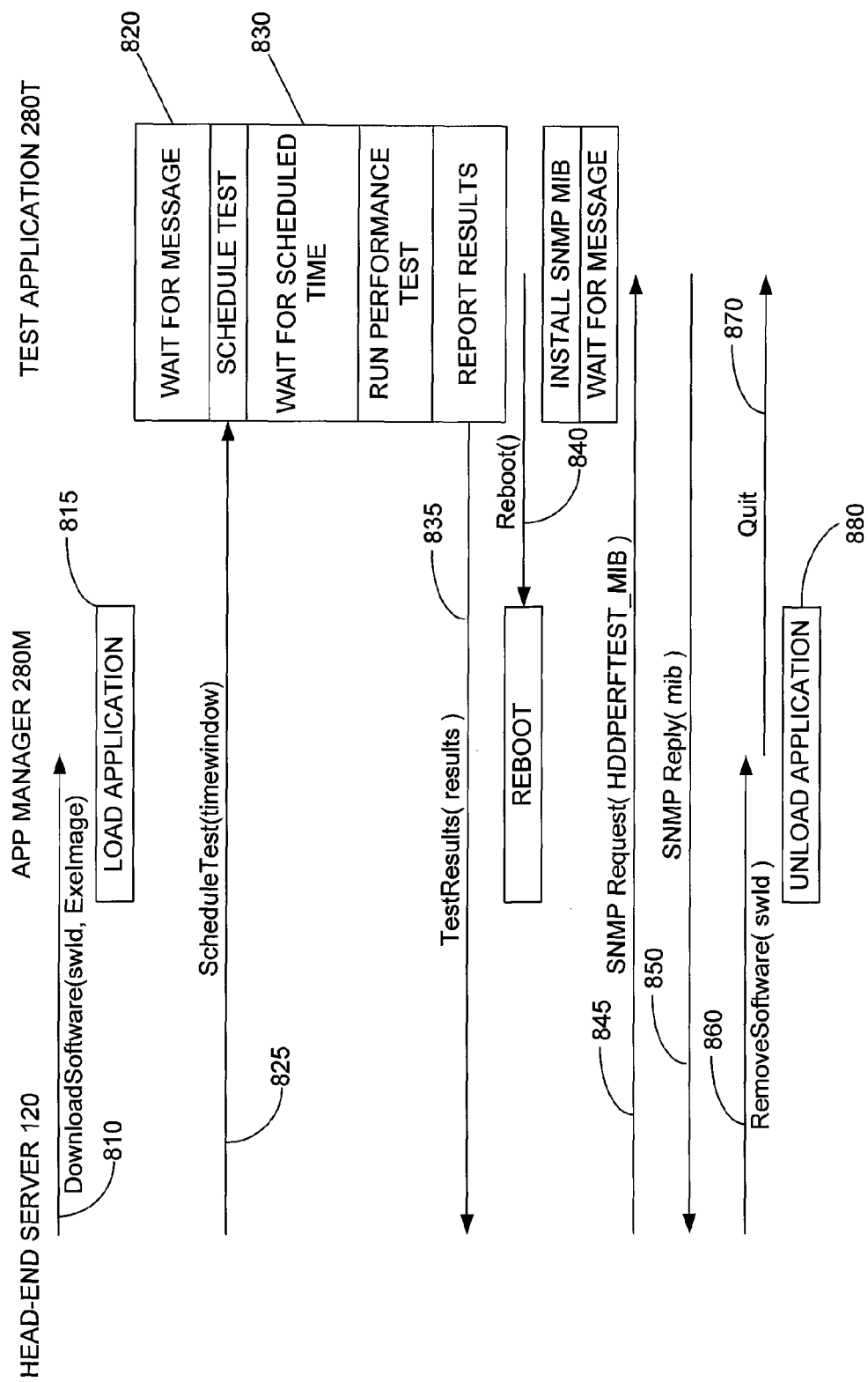
FIG. 8 is a sequence diagram showing the interaction between a head-end server and a DVR in one embodiment of a system and method for disk drive performance testing.

FIG. 8 is a sequence diagram showing the interaction between a head-end server 120 and DVR 110 in one embodiment of a system and method for disk drive performance testing. In addition to operating as a source of video programs, head-end server 120 provides a variety of services to DVR 110, such as video-on-demand, pay-per-view, program guide data, music, and Internet data access. DVR 110 and head-end server 120 communicate over a communication channel 130 which is logically bi-directional. As described earlier in connection with FIG. 1, the bi-directional channel may consist of two unidirectional channels, such as a downstream satellite path over which the DVR 110 receives programming, and an upstream telephone path in which test results and billing information are provided to the head-end server 120. In one embodiment, the telephone path comprises an analog or digital subscriber loop.

In the embodiment of FIG. 8, the disk drive performance test application 280T is a downloadable application rather than a permanent feature of DVR 110, and can communicate performance test results to the head-end server 120. This allows a head-end operator to assess disk drive performance for DVRs that have already been deployed, even if the DVRs were not shipped with performance test software.

The sequence of FIG. 8 begins with head-end server 120 sending a DownloadSoftware message (810) to DVR 110. The application manager 280M on DVR 110 loads the downloaded executable image into RAM (block 815, and disk drive performance test application 280T begins execution. Test application 280T waits (block 820) for a ScheduleTest message (825 from head-end server 120. The Schedule Test message 825 specifies a time window for initiation of the disk drive performance test. As one example of specifying a time window, the Schedule Test message 825 may contain a start time and a maximum start delay. Note that this messaging strategy will also work in with a downstream path that is unidirectional (head-end server 120 to DVR 110).

In one embodiment, the actual test start time within the window is pseudo-random, but is selected to avoid particular time periods, such as periods before and after the on-the-hour and half-hour clock times. As an example, if the testing time window is 2 AM to 4 AM, then the test would be scheduled sometime during the following intervals: 2:01 to 2:30; 2:31 to 2:50; 3:01 to 3:20; and 3:31 to 3:50. Avoiding these time periods reduces the probability that the performance test will interrupt a scheduled recording.

On receipt of the message 825, schedules the test and waits for the scheduled time (block 830). In one embodiment, test application 280T runs the disk drive performance test (described in connection with FIGS. 5-7) at the scheduled time. In another embodiment, at the scheduled time test application 280T determines if hard disk subsystem 260 is currently recording, and if so, checks again in a short period of time (e.g., one minute). This cycle continues until either no record activity is detected, or the scheduled test window closes.

After the test is completed, test results are reported by sending an unsolicited message (835) to head-end server 120. In one embodiment, the test results message 835 is sent using an unreliable transport protocol such as UDP. Note that the test randomization process spreads out the upstream reporting of the test results process and reduces peak traffic to head-end server 120.

After sending the unsolicited message 835, test application 280T requests (message 840) that application manager 280M execute a "soft" reboot, in which the system is not powered down. Using a soft reboot ensures that test application 280T remains in RAM. In one embodiment, test application 280T uses flash memory to store state information across reboots.

After reboot, test application 280T installs an SNMP MIB that contains the performance test results, and then waits for an SNMP message from head-end server 120. At some later point in time, head-end server 120 sends an SNMP request message (845) to test application 280T. On receipt of the SNMP request, test application 280T sends an SNMP reply message (850) that includes the performance test results.

After receiving the SNMP reply 850 from DVR 110, head-end server 120 sends a RemoveSoftware message (860) to application manager 280M. Application manager 280M in turn sends a Quit message (870) to test application 280T, then unloads test application 280T from memory (block 880). In one embodiment using satellite communications, DVR 110 awaits a Quit message 870 addressed to itself transmitted over the downstream satellite channel. In another embodiment using satellite communications, DVR 110 receives a Quit message 870 via the upstream telephone channel.

Figure 9:
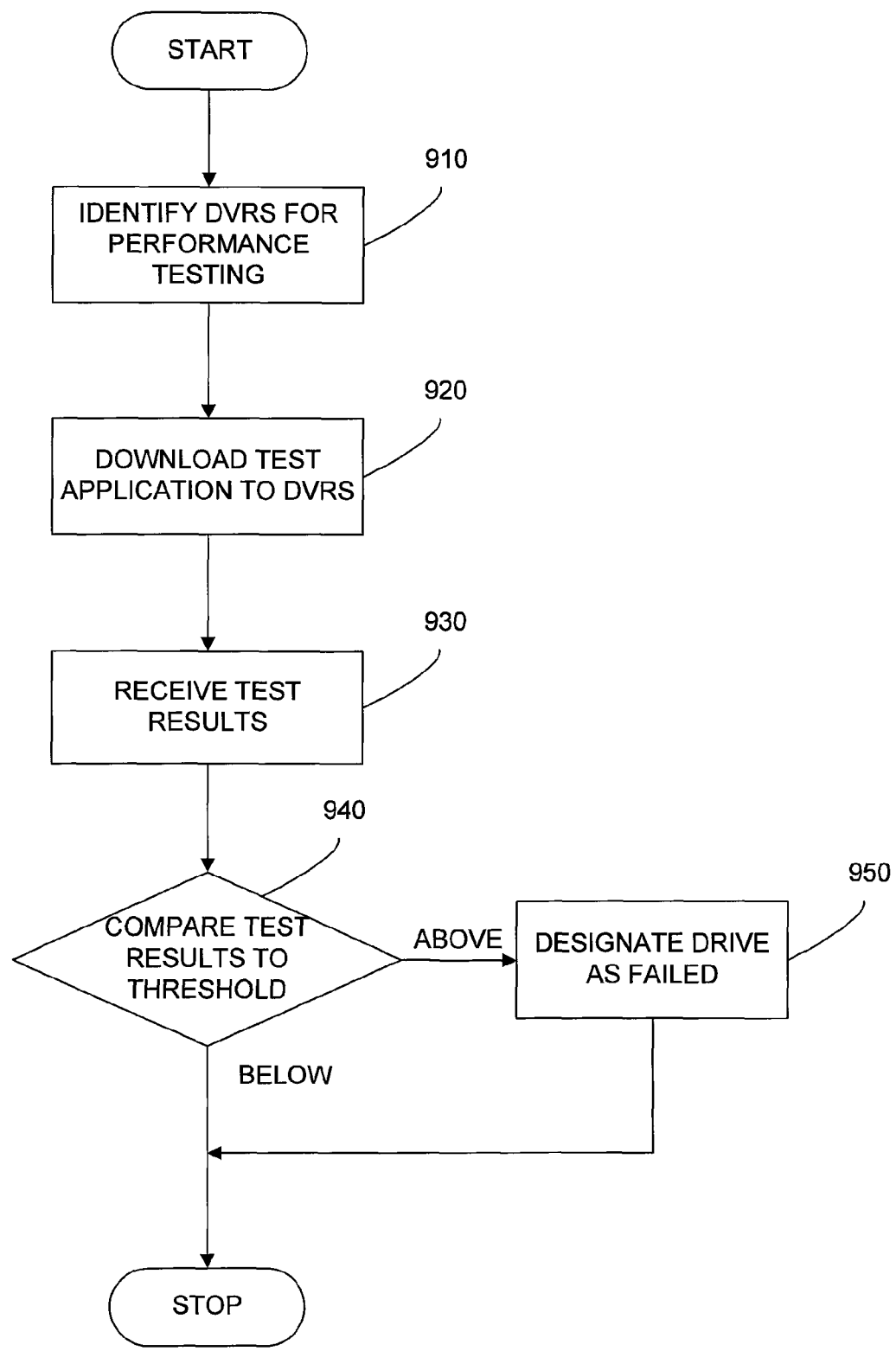
FIG. 9 is a flow chart of a method for qualifying performance of a DVR disk drive deployed in the field that includes steps performed by head-end server 120 from FIG. 1.

FIG. 9 is a flow chart of a method for qualifying performance of a DVR disk drive deployed in the field that includes steps performed by head-end server 120. At block 910, one or more DVRs 110 are identified for disk drive performance testing. Identifiers may be unique (e.g., DVR serial numbers, DVR media-access control (MAC) addresses, drive serial number, etc.) or may correspond to classes (e.g. product model number, disk drive type, etc.) At block 920, a disk drive performance test application is transmitted to the set of identified DVRs 110. In one embodiment, the digital storage media command and control (DSM-CC) protocol is used to download the test application to the client DVRs 110.

Next (block 930), performance test results are received from at least one of the DVRs 110. One of ordinary skill in the art will recognize that many mechanisms can be used for reporting test results, including relatively simply mechanisms such as unreliable messaging (e.g., unreliable datagram protocol (UDP) and more sophisticated mechanisms such as Simple Network Management Protocol (SNMP).

At block 940, test results for a particular DVR 110 are compared to a threshold. If the test results do not meet or exceed the threshold, the DVR 110 is designated as having failed the test. In one embodiment, information about DVRs 110 is stored in a head-end database, each DVR record includes a "Hard Disk Failure" field, and the failure designation uses this field.

The systems and methods for disk drive performance testing disclosed herein can be implemented in software, hardware, or a combination thereof. In some embodiments, the system and/or method is implemented in software that is stored in a memory and that is executed by a suitable microprocessor situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What we claim is:

1. A method for testing performance of a disk drive in a digital home communications terminal, the method comprising:
measuring at least one time for data transfer of a group of sectors on the disk drive, wherein measuring the at least one time for the data transfer comprises:
reading from the group of sectors to a first buffer,
seeking to the group of sectors,
staring a timer,
writing to the group of sectors from the first buffer,
enabling a write cache on the disk drive before writing to the group of sectors from the first buffer,
flushing the write cache when writing to the group sectors from the first buffer is completed, and
stopping the timer when flushing the write cache is completed;
providing the at least one time to a server over a communications channel:
providing a first error code to the server if writing to the group of sectors from the first buffer encounters a first drive error; and
providing a second error code to the server if reading from the group of sectors to the first buffer encounters a second drive error.

2. The method of claim 1, wherein measuring the at least one time for the data transfer of the group of sectors on the disk drive comprises measuring the at least one time for the data transfer of the group of sectors located at a first distance from the center of the disk drive.

3. The method of claim 2, further comprising repeating the measuring of the at least one time for a different group of sectors located at a second distance from the center, the first distance being different than the second distance.

4. The method of claim 1, wherein measuring the at least one time for the data transfer of the group of sectors on the disk drive comprises measuring the at least one time for a disk read.

5. The method of claim 4, further comprising:
disabling a read look-ahead feature of the disk drive;
starting the timer;
reading from the group of sectors; and
stopping the timer when reading from the group of sectors is completed.

6. The method of claim 1, further comprising:
responsive to a read error from reading from the group of sectors to the first buffer, reading from each sector in the group of sectors to a second buffer; and
writing to each sector in the group of sectors from the second buffer.

7. The method of claim 1, wherein measuring the at least one time for the data transfer of the group of sectors on the disk drive comprises measuring the at least one time for the data transfer of the group of sectors on a hard disk drive.

8. The method of claim 1, wherein measuring the at least one time for the data transfer of the group of sectors on the disk drive comprises measuring the at least one time for the data transfer of the group of sectors on a DVD drive.

9. A non-transitory computer-readable storage medium which stores a set of instructions which when executed performs a method for testing performance of a disk drive in a digital home communications terminal, the method executed by the set of instructions comprising:
measuring at least one time for data transfer of a group of sectors on the disk drive, wherein measuring the at least one time for the data transfer of the group of sectors comprises:
reading from the group of sectors to a first buffer,
seeking to the group of sectors,
staring a timer,
writing to the group of sectors from the first buffer, enabling a write cache on the disk drive before writing to the group of sectors from the first buffer, flushing the write cache when writing to the group sectors from the first buffer is completed, and stopping the timer when flushing the write cache is completed;

providing the at least one time to a server over a communications channel;

providing a first error code to the server if writing to the group of sectors from the first buffer encounters a first drive error; and providing a second error code to the server if reading from the group of sectors to the first buffer encounters a second drive error.

10. The non-transitory computer-readable storage medium of claim 9, wherein measuring the at least one time for the data transfer of the group of sectors on the disk drive comprises measuring the at least one time for the data transfer of the group of sectors located at a first distance from the center of the disk drive.

11. The non-transitory computer-readable storage medium of claim 9, further comprising repeating the measuring of the at least one time for a different group of sectors located at a second distance from the center, the first distance being different than the second distance.

* * * * *